Oct. 25, 1960  H. M. LOEBER  2,957,422
PUMPS
Filed Jan. 9, 1956  2 Sheets-Sheet 2
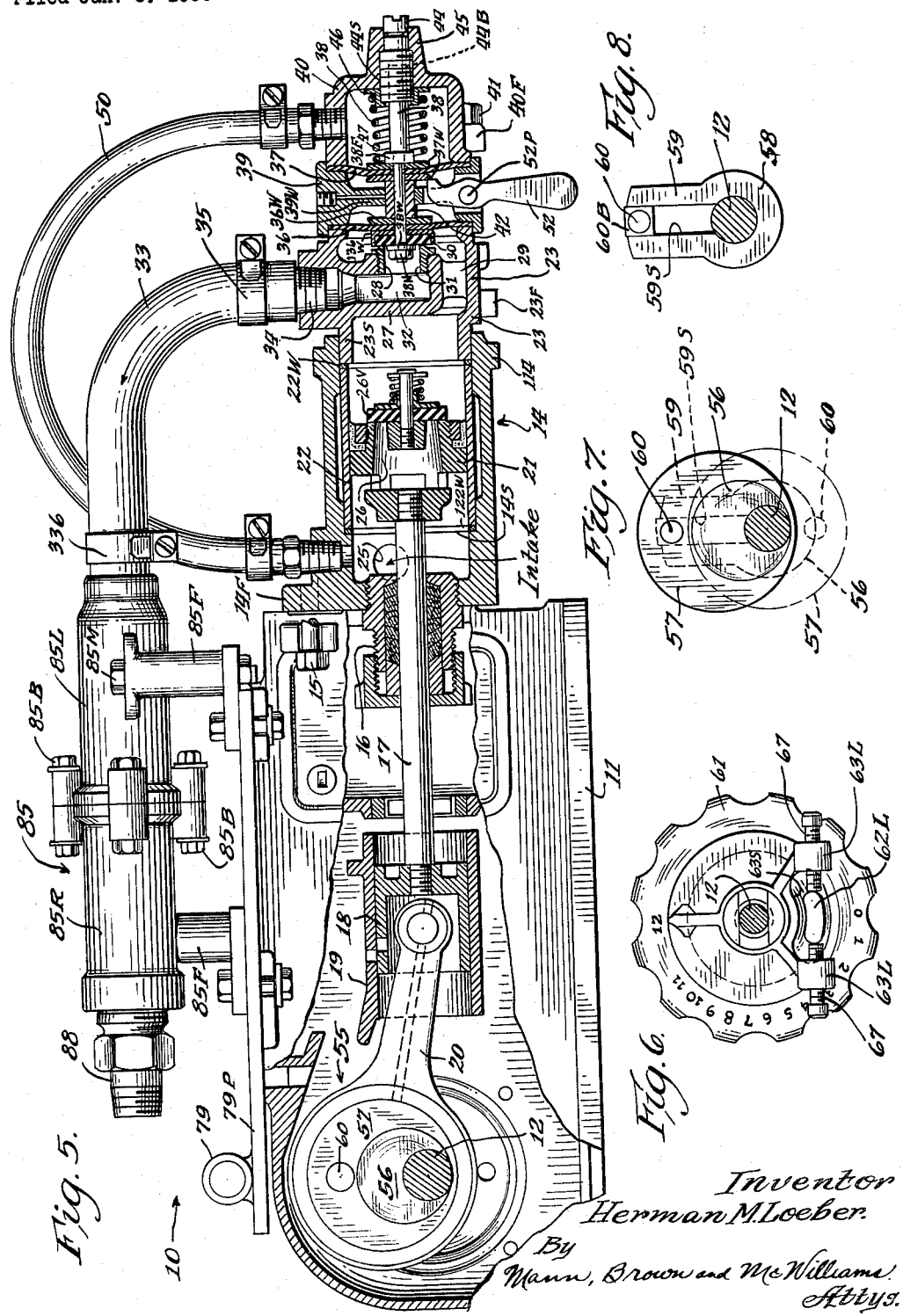
Inventor
Herman M. Loeber
By Mann, Brown and McWilliams
Attys.

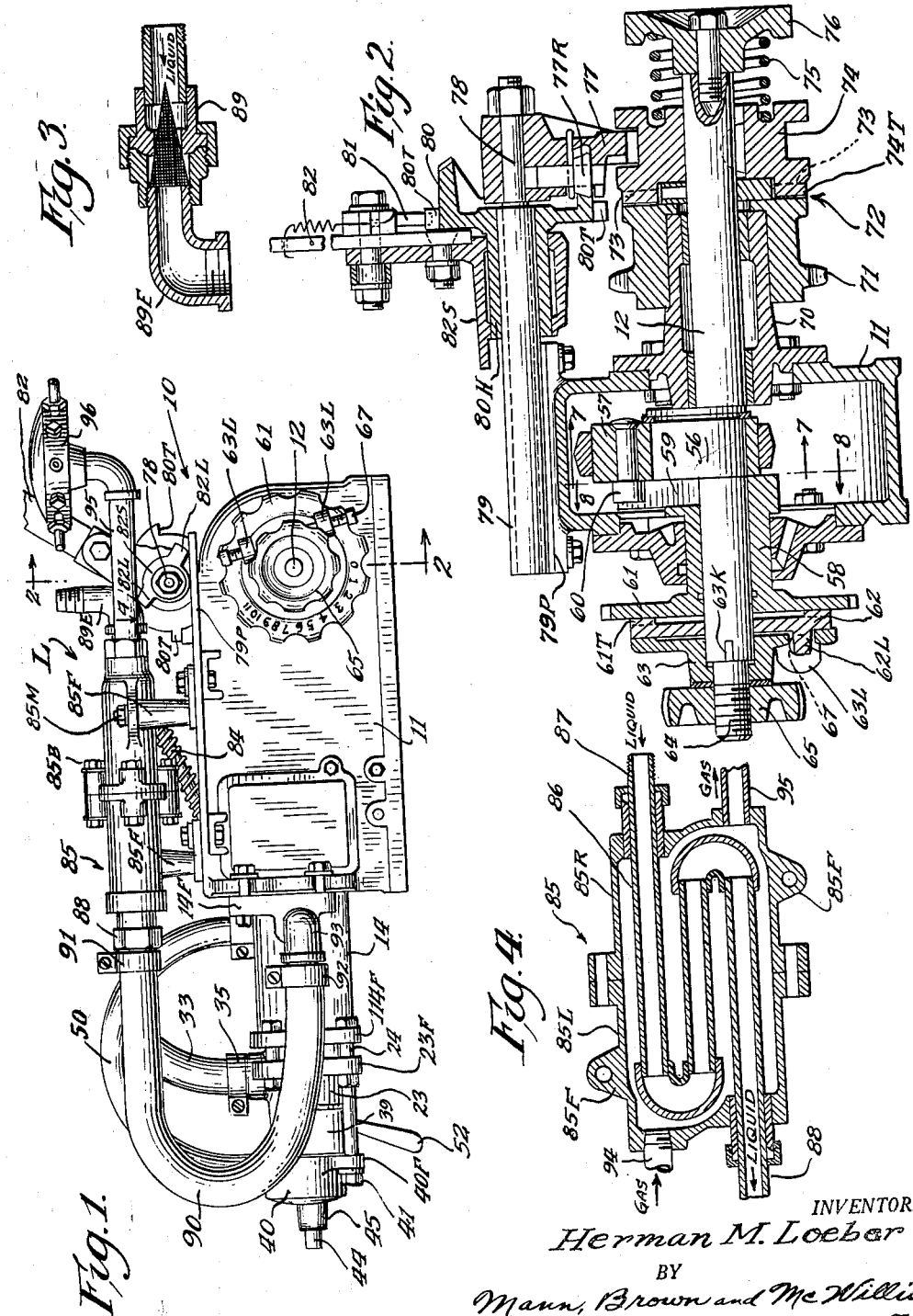

United States Patent Office 2,957,422
Patented Oct. 25, 1960

2,957,422
PUMPS

Herman M. Loeber, Beatrice, Nebr., assignor to Dempster Mill Mfg. Co., a corporation of Nebraska Filed Jan. 9, 1956, Ser. No. 558,079

2 Claims. (Cl. 103—40)

This invention relates to pumps and particularly to pumps of the variable stroke positive displacement type adapted among other things for metering liquified gases such as anhydrous ammonia.

Anhydrous ammonia has been widely used as a fertilizer, and in applying the fertilizer to the ground, the liquid is metered while maintained in its liquified form, and upon discharge at a lower pressure the ammonia assumes its gaseous state and is fed to a manifold from which it is distributed to discharge nozzles located behind earth cutting implements. These earth cutting implements cut a deep furrow and the gas is discharged a considerable distance below the ground and is trapped in this location by causing the earth to fall into the narrow furrow immediately behind the earth cutting implement. The metering pump in such an instance is driven in a timed relation to a ground wheel on the fertilizing implement that is being used, and thus the uniform distribution of the fertilizer is obtained regardless of the speed of movement of the implement.

The primary object of the present invention is to provide a positive displacement pump that is adjustable insofar as its metering output may be concerned and which provides for handling of the anhydrous ammonia as well as other liquids with a minimum of difficulty, and an important object related to the foregoing is to provide such a pump wherein the adjustment of metered output is attained in such a manner that the sudden pressure changes in the liquid are avoided, thus, to particularly adapt the same for metering liquified gases and to minimize flashing or bubbling of the liquid.

Liquified gases such as anhydrous ammonia tend of course to assume a gaseous form depending upon the interrelated factors of temperature and pressure of the liquid, and another object of this invention is to afford a pump wherein sudden changes of pressure are avoided and in which the liquid is maintained at a sufficiently high pressure at all times until it is to pass to the low pressure zone of the system. Such metering of liquified gases is of course volumetric in its nature, and the present metering pump is arranged so that the liquid is mainent ained at a relatively high pressure until such time as the metering movements of the pump piston have taken place, and under the present invention the arrangement is such that the maintained pressure is applied to the outlet valve of the system so that the liquid being metered cannot pass the outlet valve until the pump applies an additional pressure that may be termed the output pressure.

A further object of the present invention is to provide a pump of the aforesaid character in which the stroke adjustment for the pump is attained in such a way that the pump has a uniform movement in its intake and output strokes.

As in all pumps, metering pumps of the aforesaid character that are used for metering a liquified gas such as anhydrous ammonia are subject to vapor lock particularly due to the vaporization of the liquified gas, and the present invention therefore has for another object the provision of a simplified and effective priming or venting means for the pump so that gas that may gather in the metering chamber may readily be discharged so as to reestablish the normal and expected metering operation of the pump. A further and more specific object of the invention is to provide a simplified arrangement whereby the pressure loaded outlet valve for the metering pump may also serve as the priming or venting valve.

Other and further objects of the present invention will become apparent from the following description and claims, which by way of illustration, show a preferred embodiment of the present invention and the principles thereof, and what I now consider to be the best mode which I have contemplated applying these principles. Other embodiments of the invention embodying the same or equivalent principles may be used and structural changes may be made as desired by those skilled in the art without departing from the invention.

In the drawings:

Fig. 1 is a side elevational view of a metering pump embodying the invention;

Fig. 2 is a vertical sectional view at an enlarged scale taken substantially along the line 2—2 of Fig. 1;

Fig. 3 is a cross sectional detail of an inlet strainer connection that may be used;

Fig. 4 is a plan sectional view taken substantially along the line 4—4 of Fig. 1 and illustrating the heat exchange;

Fig. 5 is a longitudinal vertical section through the pump cylinder and the operating mechanism;

Fig. 6 is a side elevational view of the stroke adjusting means; and

Figs. 7 and 8 are sectional views taken respectively along the lines 7—7 and 8—8 of Fig. 2.

For purposes of the disclosure the invention is herein illustrated as embodied in the metering pump 10 that is adapted to be mounted on a farm implement to meter a liquified gas such as anhydrous ammonia. The metering pump 10 comprises a usual pump base 11 having a transverse drive shaft 12 rotatably mounted therein adjacent one end, the left hand end as viewed in Fig. 5, and at the other end of the pump base 11, a horizontally extending pump cylinder 14 is mounted. The cylinder 14 is flanged at its mounting or left hand end as viewed in Fig. 5, such flange being identified as 14F, and the cylinder 14 is secured in position on the adjacent end of the base 11 by means of a plurality of screws 15 that cooperate with the flange 14F. The left hand or fixed end of the cylinder 14 has a threaded axial opening therein to receive a packing gland 16 through which a piston rod 17 is slidable, and its left hand or rear end as viewed in Fig. 5, the piston rod 17 is connected to a cross head 18 that is longitudinally guided on the axis of the pump cylinder by a stationary cross head guide 19. The cross head 18 is operatively connected to driving mechanism carried on the drive shaft 12 by means including a connecting link 20.

Within the cylinder 14 the connecting rod 17 has a piston 21 mounted thereon for sliding movement within a piston liner 22 that is located within the cylinder 14. The remote or right hand end of the cylinder 14 has a cylinder head 23 secured thereon, as will be hereinafter described, and this cylinder head 23 is arranged to embody the necessary outlet passages and to cooperate with outlet valve mechanism as will be described.

The cylinder head 23 has a flange 23F thereon, Figs. 1 and 5, and fastening bolts 24 are extended through this flange and a flange 114 on the adjacent end of the cylinder 14 to secure the head 23 in position. The head 23 has a sleeve 23S that extends into the end of the cylinder 14, and the sleeve 23S engages a washer 22W to press the same against the adjacent end of the cylinder sleeve 22. A similar washer 122W is interposed between the other end of the sleeve 22 and a shoulder 14S formed within the cylinder 14, thus when the bolts 24 are tightened, the sleeve 22 is firmly clamped in a proper sealed relation within the cylinder 14.

The liquid to be metered enters the rear or left hand end portion of the cylinder 14 through an inlet opening 25, and passes through inlet passages 26 in the piston 21 and past a spring loaded inlet valve 26V carried by the piston 21 and into the right hand end of the cylinder 14 which constitutes the pumping space of the present pump.

The cylinder head 23 serves as a mounting upon which the outlet valve means of the pump are positioned, and for this purpose the outer or right hand end of the cylinder head 23 is formed with an annular open end, and between the two ends of the cylinder head an internal cored section 27 is formed with an opening 28 in the wall thereof that is remote from the pumping chamber. The space beyond or to the right of the cored section 27 communicates through a passage 29 with the pump chamber, and liquid from the pump chamber passes through the passage 29 and flow thereof through the outlet opening 28 is controlled by an outlet valve 30. The outlet valve 30 is mounted, as will hereinafter be described, for movement on the axis of the pump chamber toward and away from a removable valve seat 31 that is threaded into the opening 28, and liquid that passes through the outlet port that is afforded by the sleeve-like valve seat 31 passes into an outlet passage 32 to a discharge hose 33 that is connected by means of a nipple 34 and a hose clamp 35 to the passage 32.

The valve 30 is of the diaphragm-operated type and in the present instance the diaphragm means are afforded by a pair of spaced similar diaphragms 36 and 37 which are associated with a valve stem 38 upon which the valve 30 is mounted. In providing a mounting for the diaphragms 36 and 37 a diaphragm spacer casting 39 and a housing 40 are provided, the outer edge of the diaphragm 36 being clamped between the end of the cylinder head 23 and one side of the spacer 39, while the other diaphragm 37 is clamped between the other end of the spacer 39 and adjacent end of the housing 40. The housing 40 and the spacer 39 are held in their desired clamping relationship by a plurality of bolts 41 that extend through a flange 40F on the housing 40 and are threaded into the flange 23F that is provided on the cylinder head 23.

The valve stem 38 has an enlarged flanged portion 38F formed thereon intermediate its ends, and the diaphragm 37 is disposed adjacent the flange 38F between washers 37W, one of which abuts the flange 38F, and to the left of this diaphragm assembly, as viewed in Fig. 5 of the drawings, a spacer sleeve 42 surrounds the valve stem 38 and is slidably positioned in an opening in a central wall 39W of the diaphragm spacer. To the left of the spacer sleeve 42, the diaphragm 36 is positioned between a flat washer 36W and a cup washer 136W, the cup washer serving to confine the resilient valve 30. Beyond the valve, a washer 38W and a nut 38N are positioned so that by tightening the nut 38N, the two diaphragms 36 and 37 may be clamped in position on the valve stem 38.

At its right hand end as viewed in Fig. 5, the valve stem 38 extends slidably into a bore 44B that is formed in an axial adjusting screw 44, such adjusting screw being extended outwardly or axially through an elongated sleeve 45 formed on the housing 40, and the screw 44 being in screw-threaded engagement with the sleeve 45 as indicated at 44S in Fig. 5. At its inner end the screw 44 engages an inturned flange of a spring-cup 46 so that by inward adjustment of the screw 44 the cup 46 may be moved toward the diaphragm 37, and this is utilized to adjust a compression of a coil spring 47 that surrounds the valve stem 38 within the housing 40 and acts between the spring-cup and the adjacent washer 37W so as to urge the valve 30 toward its closed position.

The housing 40 is connected to the pump cylinder 14 at a point adjacent to the inlet 25 and this is accomplished by means of a hose connection 50. Thus the pressure of the fluid acting on opposite sides of the diaphragm assembly is substantially equal, and the valve 30 is maintained closed by the action of the spring 47.

It will be apparent of course to those skilled in the art that the operation of the pump as a metering pump is dependent upon the premise that all of the passages are continually filled with liquid, but since there is always a possibility that the pump may become vapor-locked when undue reduction of pressure or undue increase of temperature causes bubbling of the liquid, it is necessary to provide venting means for venting the gas from the pump chamber so as to thereby prime the pump. Under the present invention this is accomplished by utilizing the outlet valve 30 as a venting means, and this is made possible through the use of the two spaced diaphragms 36 and 37 which afford an accessible space within which a manual valve opening force may be applied to the valve stem 38. As shown in Fig. 5, such manual force may readily be applied by means of a vent lever 52 that extends radially through the side of the diaphragm spacer 39 and is pivoted at 52P near the outer edge of the spacer 39. At its inner end, the lever 52 is arranged to bear against the adjacent washer 37W, and by rocking the lever 52 in a clock-wise direction, as viewed in Fig. 5, the outlet valve 30 may be opened at will to vent gas from the pump chamber. Such gas of course is forced from the chamber by the pressure of the incoming liquid and the pump is thus primed.

The drive of the present pump is adjustable in character so that the metering stroke of the pump may be variably set. Thus, as shown in Figs. 2 to 8, the connecting link 20 is driven from the shaft 12 by an adjustable double eccentric drive 55. This double eccentric drive comprises an inner eccentric 56 fixed on the shaft 12 and an outer eccentric 57 that is mounted on the eccentric 56 and which may be adjusted to different positions about the eccentric 56 so as to thereby variably adjust the total throw of the double eccentric drive 55. Such adjustment is accomplished through a preliminary adjusting sleeve 58 which has a radial slotted arm 59 extending therefrom within the crank case 11 and immediately adjacent to one side of the double eccentric 55. The slot 59S of the slotted arm 59 engages the squared end 60B of the pin 60 which is free to turn in the outer eccentric 57 so as to project from one side thereof and into such slot, and by rotating the sleeve 58 about the axis of the shaft 12, the position of the outer eccentric 57 on and with respect to the inner eccentric 56 may be adjusted, as will be evident in Figs. 5 and 7, from a zero stroke adjustment to a maximum stroke adjustment.

Such adjustment of the sleeve 58 is accomplished externally of the crank case 11 by providing a relatively large outward flange 61 on the sleeve 58 and having a series of teeth 61T about its outer face in an annular relationship. These teeth are adapted to be engaged by similar opposed teeth on an intermediate adjustment plate 62 that is disposed on the shaft, and outwardly of the plate 62 a head 63 is mounted on the shaft for slidable movement, but the head 63 is keyed at 63K against rotation relative to the shaft. The end of the shaft 12 is threaded at 64 and a nut 65 in the nature of a hand wheel is threaded onto the end of the shaft so that the members 63 and 62 may be urged to the left into the proper interlocked relationship.

The head 63 and the intermediate plate 62 are arranged to give what may be termed fine or vernier adjustment of the stroke of the pump, and in accomplishing this the plate 62 has a projecting lug 62L thereon that extends through a slot 63S in the adjacent flange of the head 63. This flange of the head 63 has a pair of lugs 63L formed thereon and screws 67 are threaded through these lugs to engage opposite sides of the lug 62L of the plate 62. With this arrangement the rotative position of the outer eccentric 57 may be given a rough adjustment by shifting the position of the sleeve 58 to a point near the adjusted position that is desired, after which the teeth 61T and the related teeth on the plate 62 may be moved into axial engagement by tightening of the hand wheel or nut 65. The desired accurate adjustment of the pumping stroke may then be attained by rotative adjustment of the intermediate plate 65 with respect to the head 63, this being accomplished by the adjusting screws 67.

With the arrangement that is thus provided, the pumping stroke of the pump may be accurately adjusted so as to attain the desired metered output, and this adjustment is attained with the present structure in such a way that the piston has a gradual acceleration and deceleration at both ends of its pumping stroke. This minimizes sudden changes in pressure so as to thereby prevent any tendency toward flashing or vaporization of the liquified gas.

The pump of the present invention is most commonly used on agricultural implements where the location of the pump is remote from the normal position occupied by the operator of the implement, and in every instance the axis of the drive shaft 12 of the pump must extend parallel to the axis of the wheels of the vehicle upon which the pump is mounted. It is desirable to provide for convenient starting and stopping of the pump 10 by the operator of the implement while the operator remains in his usual position on the vehicle. This is accomplished under the present invention through clutch means that are mounted on the other end of the drive shaft 12 and which are adapted for remote actuation between engaged and disengaged positions. Thus, as will be evident in Fig. 2 of the drawings, the shaft 12 projects from the right hand side of the pump housing 11 through a projecting sleeve-like bearing fitting 70, and at the outer end of this bearing fitting 70, a drive sprocket 71 is mounted so as to surround the bearing fitting 70 and be rotatable thereon. The sprocket 71 also constitutes the driving element of a drive clutch 72 and for this purpose has teeth 73 extended axially therefrom. The other or driven element 74 of the clutch is splined on the shaft 12 for axial shifting movement, and has complemental teeth 74T adapted to engage the teeth 73. The driven element 74 of the clutch is urged toward the driving element of the clutch by a coil spring 75 that acts between a head 76 on the shaft and the clutch member 74. The clutch member 74 has an annular groove 74G therein and a clutch control fork 77 engages this groove so that the clutch may be disengaged by shifting of the driven element 74 to the right as viewed in Fig. 2.

The clutch fork 77 is mounted on one end of a slide rod 78 that is slidably supported in a sleeve 79, such sleeve being mounted in an overhanging or projecting relation on a support plate 79P carried on the top of the pump frame or crank case 11. Means are mounted on the projecting end of the sleeve 79 whereby the position of the rod 78 and the fork 77 may be controlled. Thus a face cam 80 has its mounting hub 80H surrounding and rotatably mounted on the sleeve 79, and the cam surface is provided as an edge on a cylindrical flange on the cam member 80. This cam surface engages a roller 77R that is mounted in the fork 77, and by rotation of the cam member 80 the fork may be shifted to the right in Fig. 2 to disengage the clutch 72, and upon further rotation in the same direction, the cam perimts the clutch member 74 to return to its engaged position.

The rotative movements of the cam 80 that are necessary to effect clutch engaging and disengaging operations are imparted to the cam by a ratchet mechanism. Thus the cam 80 has a plurality of ratchet teeth 80T formed thereon that are adapted to be engaged by a pawl 81 that is carried on an operating lever 82. The operating lever 82 is pivoted about the bearing hub 80H of the cam 80 by a bearing sleeve 82S that surrounds the hub 80H, and the lever 82 is urged in a clock-wise direction, Fig. 1, to its normal retracted position by a return spring rod 84. Then when it is desired to impart rotation to the cam 80, this may be done by means of a rope extended to the left in Fig. 1 toward the position occupied by the operator of the implement. The range of rocking movement of the lever 82 is limited by lugs 82L that project longitudinally from the sleeve 82S over the plate 79P so as to be engageable with such plate. Similar rocking movements imparted to the lever 82 will thus enable the operator to engage or disengage the clutch 72 as desired.

In the handling of anhydrous ammonia it is well known that on cool mornings, when the tank pressure is relatively low, there is a tendency for the liquid to bubble during the pumping operation and this results in vapor lock of the pump. The present pump therefore provides means for cooling the incoming liquid and for this purpose makes use of the available cooling action of the ammonia as it expands after passing the outlet valve 30. For this purpose a heat exchanger 85 is provided, this heat exchanger being made up in separate sections 85R and 85L which are flanged at their adjacent ends and secured together by bolts 85B to provide an internal chamber through which the expanding gas may pass. The heat exchanger 85 has mounting feet 85F formed thereon and bolts 85M are passed through the feet 85F to secure the heat exchanger in position over the plate 79P. This heat exchanger has an internal coil 86 formed from tubing and providing an inlet connector 87 and an outlet connector 88 as shown in Fig. 4 of the drawings.

The inlet fluid from the supply tank is led through a strainer 89 that embodies an elbow 89E, Figs. 1 and 3, that is connected to the connector 87, and the inlet or supply liquid thus passes through the coil 86 to outlet connector 88 and a hose 90 is connected by means including a hose clamp 91 to the outlet connector 88, the other end of the hose 90 being connected by means including a clamp 92 and an elbow 93 to the inlet 25 of the pump.

The outlet or discharge hose 33 of the pump is connected by means of a hose clamp 33G to an inlet fitting 94 that is provided on the section 85L of the heat exchanger, and the expanding gas is discharged from the changer through a pipe 95 that leads to a distributing manifold 96 from which hoses are extended to the various fittings that are located behind the ground engaging elements of the fertilizing implement.

From the foregoing description, it will be apparent that the present invention provides a pump for anhydrous ammonia in which an adjustable stroke is afforded in the pump in such a manner that sudden changes in the liquid pressure are avoided so as to adapt the pump for metering liquified gases in such a way as to minimize flashing or bubbling of the liquid. This same accurate adjustment of the pumping stroke also enables the basic pump structure to be employed in other pumping applications. It will also be evident that the present invention affords a metering pump for anhydrous ammonia wherein the pump may be vented or primed in a simple manner, and particularly it will be apparent that this is accomplished through the use of the normal outlet valve of the pump.

It will also be apparent that the present invention provides a metering pump of the aforesaid character that is simple and economical in structure and which is adapted for upkeep and servicing by the usual farm worker.

Thus while I have illustrated and described the invention in a particular embodiment, it will be recognized that changes and variations may be made within the spirit and scope of the invention.

I claim:

1. In a metering pump for metering liquified gas having a piston and cylinder pump having an inlet valve, and a cylinder head having an axial outlet port formed therein facing away from said cylinder, the improvement that comprises a valve for said port having a valve stem, a pair of diaphragms secured on said stem in axially spaced positions, a diaphragm spacer disposed between said diaphragms and clamping the border of one of said diaphragms against said cylinder head to close the head of the cylinder and dispose said valve in opposed relation to said port, a spring housing clamping the border of the other diaphragm against the other side of said spacer and defining a pressure chamber for applying fluid pressure to said other diaphragm in a valve closing direction, a valve-closing spring in said housing and acting on said valve stem to urge said valve to closed position, and a manual valve opening lever extending into the space between said diaphragms for applying valve opening movement to said valve stem.

2. In a metering apparatus for liquified gas having means defining an expansible chamber pump having an inlet valve, and a head for said chamber having an axial outlet port formed therein, the improvement which comprises a valve for said port having a valve stem, a pair of diaphragms secured on said stem in axially spaced positions, a diaphragm spacer disposed between said diaphragms and clamping the border of one of said diaphragms against said cylinder head to close the head of the cylinder and dispose said valve in opposed relation to said port, a spring housing clamping the border of the other diaphragm to the other side of said spacer and defining a pressure chamber for applying fluid pressure to said other diaphragm in a valve closing direction, guide means forming part of said spacer for guiding said stem intermediate said diaphragms, a guide sleeve extended in threaded relation through said housing for guiding said stem for sliding valve opening and closing movements, a valve closing spring in said housing and acting between said stem and said guide sleeve and adjustable by said guide sleeve to vary the valve closing action of said spring, and manual valve opening means mounted on said spacer and extending into the space between said diaphragms for applying valve opening movement to said valve stem.

References Cited in the file of this patent

UNITED STATES PATENTS

| | | |
|---|---|---|
| 2,313,551 | Hurlbut | Mar. 9, 1943 |
| 2,370,582 | Rodway | Feb. 27, 1945 |
| 2,458,230 | Warcup | Jan. 4, 1949 |
| 2,503,907 | Hefler | Apr. 11, 1950 |
| 2,528,653 | Hedquist | Nov. 7, 1950 |
| 2,592,237 | Bradley | Apr. 8, 1952 |
| 2,696,785 | Blue | Dec. 14, 1954 |
| 2,733,661 | Surgi | Feb. 7, 1956 |
| 2,771,846 | Horton et al. | Nov. 27, 1956 |
| 2,811,108 | Horton et al. | Oct. 29, 1957 |

OTHER REFERENCES

John Blue Instruction Manual (page 5), March 1954.